United States Patent [19]
Abe

[11] Patent Number: 5,854,791
[45] Date of Patent: Dec. 29, 1998

[54] COMMUNICATION CONTROL APPARATUS

[75] Inventor: Kohei Abe, Yokohama, Japan

[73] Assignee: Kabushiki Kaisha Toshiba, Tokyo, Japan

[21] Appl. No.: 595,783

[22] Filed: Feb. 2, 1996

[30] Foreign Application Priority Data

Feb. 3, 1995 [JP] Japan .................................... 7-017186

[51] Int. Cl.$^6$ ...................................................... H04J 3/02
[52] U.S. Cl. ........................ 370/412; 370/426; 340/825.5
[58] Field of Search .................... 370/395, 389,
370/351, 352, 353, 360, 366, 368, 369,
370, 373, 378, 379, 412, 414, 416, 418,
422, 426, 428, 429; 340/825.5, 825.51

[56] References Cited

U.S. PATENT DOCUMENTS

| | | | |
|---|---|---|---|
| 5,164,939 | 11/1992 | Shobatake | 370/416 |
| 5,497,371 | 3/1996 | Ellis et al. | 370/412 |
| 5,689,508 | 11/1997 | Lyles | 370/418 |

*Primary Examiner*—Huy D. Vu
*Attorney, Agent, or Firm*—Loeb & Loeb LLP

[57] ABSTRACT

The communication control apparatus can suppress the maximum cell intervals and further enables the simultaneous transmit decision processing for a plurality of the virtual lines. A communication control apparatus used for asynchronous communication executed by setting a transmit enable time at which data can be transmitted to each of a plurality of virtual lines, and by deciding the virtual lines having transmissible data on the basis of the transmit enable times comprises: a time comparing section (1) for comparing the transmit enable times set to a plurality of the virtual lines having transmissible data, respectively with transmit decision time at the same time, to generate comparison result signals; a flag holding section (3) for holding the comparison result signals generated by the time comparing means for each of a plurality of the virtual lines, and erasing the held comparison result signal of a predetermined virtual line in response to a clear signal; and a priority deciding section (5), when a plurality of data-transmissible comparison result signals are held in the flag holding means at the same transmit decision time, for deciding priority sequence of the virtual lines corresponding to the comparison result signals on the basis of rewritable priority flags decided for each of a plurality of the virtual lines to decide one of the virtual lines to be transmitted, and for outputting a clear signal to the flag holding means to erase the comparison result signal of the decided virtual line.

24 Claims, 7 Drawing Sheets

F I G. 5 PRIOR ART

COMMUNICATION CONTROL APPARATUS

FIELD OF THE INVENTION

The present invention relates to a communication control apparatus for an asynchronous transfer mode (referred to as an ATM mode, hereinafter) at a broadband aspect of integrated services digital network (referred to as B-ISDN, hereinafter), and in particular to a communication control apparatus for deciding a virtual line to be transmitted from a plurality of virtual lines on the basis of a priority control decision.

BACKGROUND OF THE INVENTION

In the ATM communication control apparatus, a frame of a specific virtual line is divided into data of a predetermined length (referred to as a cell), and the cell intervals are controlled by the asynchronous transfer in order to adjust the effective transfer capacity. Further, the intervals between these cells are filled with cells of another virtual line controlled in the same way or non-used (empty) cells.

In the above-mentioned ATM communication control apparatus, therefore, it is necessary to provide a transmit decision function for deciding whether the succeeding cell to be transmitted exists or for deciding the virtual line from which the succeeding cell is transmitted. In the conventional communication control apparatus, this transmit decision function has been so far realized as follows:

FIG. 4 shows a first example of the conventional transmit decision function for the communication control apparatus. In this example, the respective virtual lines are grouped on the basis of the maximum cell transmit rate, that is, the peak cell rate (referred to as PCR, hereinafter), and in addition periodic deciding means 101 to 104 for deciding data transmission are provided for the grouped virtual lines, respectively. Therefore, the virtual lines 101a to 101d; 102a; and 103a to 103c each having cells to be transmitted are cued by each of a plurality of the periodic deciding means 101 to 104, respectively. In other words, since the virtual lines 101a to 101d are of the same PCR, these virtual lines are cued by the periodic deciding means 101 of PCR#1. In the same way, the virtual lines 102; and 103a to 103c are cued by the periodic deciding means 102 of PCR#2 and the periodic deciding means 103 of PCR#3, respectively.

To decide the virtual lines to be transmitted, one of the periodic deciding means 101 to 104 is selected according to the priority sequence, and a transmit enable time set to the selected virtual line and designated by a head pointer of the selected periodic deciding means is compared the transmit decision time (the current time). When the transmit enable time matches the transmit decision time, the virtual line is decided as being transmitted. In the case of mismatch, however, the transmit decision is shifted to the succeeding virtual line on the basis of the pointer set to the mismatch virtual line. Further, when the above-mentioned retrieval reaches the virtual line designated by the tail pointer of the periodic deciding means, the retrieval is shifted to the succeeding periodic deciding means. As described above, in the case of the first example, the transmission of cells are decided by cuing the respective virtual lines for each same PCR, separately.

Figure 5:
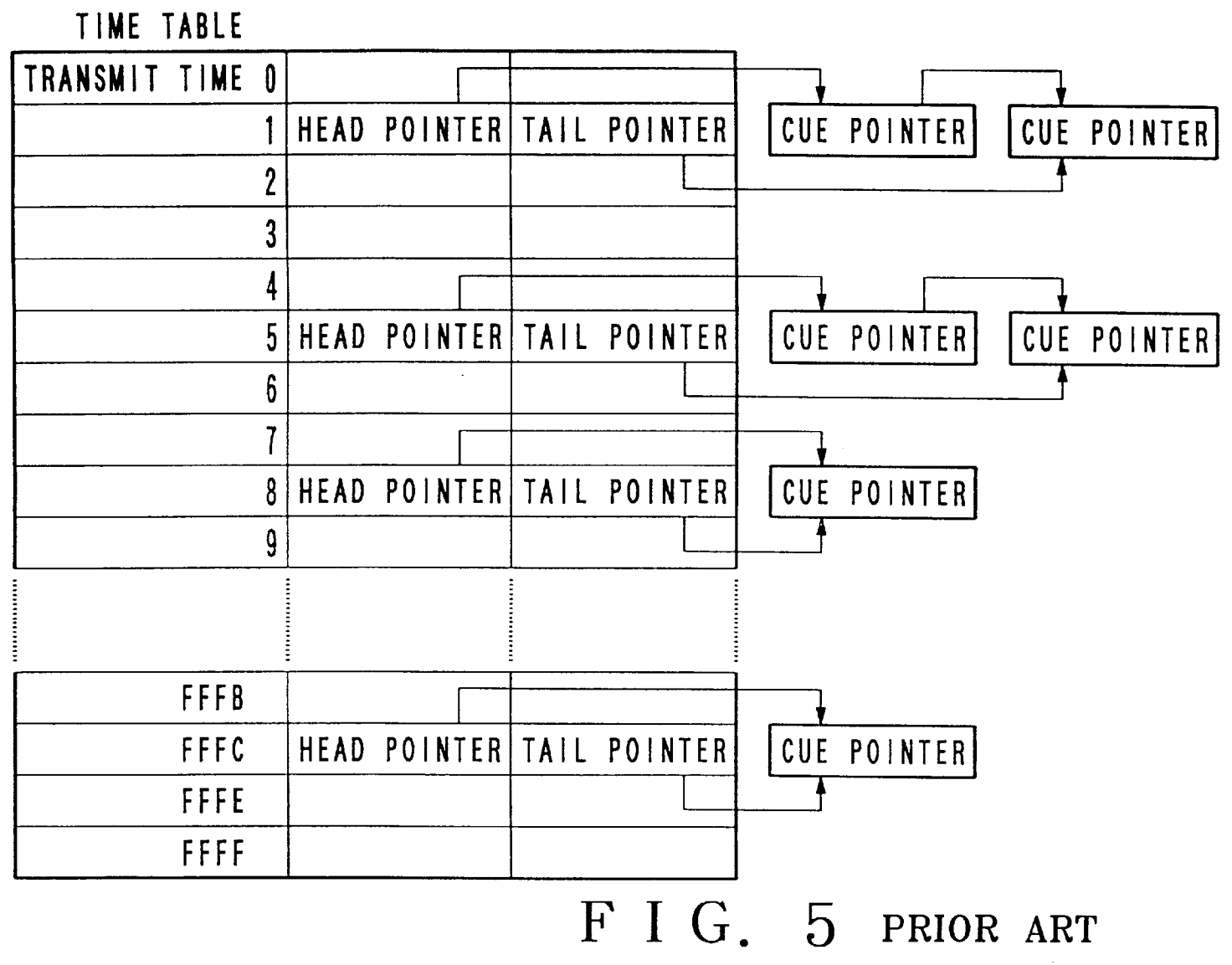

FIG. 5 shows a second example of the transmit decision function of the conventional communication control apparatus. In this example, a time table for cuing the respective virtual lines for each transmit time is provided. This time table has a head pointer and a tail pointer of the transmissible virtual lines for each transmit time. In the register of the virtual lines In the time table, when there exist no other registered virtual lines at a predetermined transmit time, the virtual line is registered to the head pointer and the tail pointer at the predetermined transmit time. Further, when there exist the other registered virtual lines at a predetermined transmit time, the virtual line is cued after the virtual line corresponding to the tail pointer and further the tail pointer is updated.

To decide the cell transmission, the cuing at the transmit decision time (the current time) is selected from the time table (time managing means), and the cells are transmitted in sequence beginning from the first cued virtual line. As described above, in the second example, the cell transmission is decided by cuing the respective virtual lines for each time.

However, the above-mentioned first and second examples of the conventional communication control apparatus involve the following drawbacks:

In general, as the cell transmission methods, there are three sorts of constant bit rate (CBR), variable bit rate (VBR), and available bit rate (ABR). In the case of the CBR, the cells are transmitted at a constant rate (e.g., PCR). In the case of the VBR, the cells are transmitted by controlling the burst transfer rate at the PCR and the average transfer rate less than the PCR with respect to time. In the case of the ABR, the cells are transmitted by changing the transfer rate with respect to time on the basis of the line available condition and in accordance with the PCR (peak cell rate) and the MCR (minimum cell rate) (this minimum cell rate must be ensured). In the CBR and VBR, since audio and video signals are transmitted in particular, the maximum cell interval must be suppressed or controlled at the minimum possible value. Further, in the ABR, since the maximum cell intervals (i.e., MCR) must be ensured, the following problems arise in the conventional methods:

In the apparatus of the first method, since the virtual lines cued by the periodic deciding means are decided for transmission in sequence, the virtual lines cued before the selected periodic deciding means are transmitted with priority. Accordingly, the virtual lines cued by the non-selected periodic deciding means or the virtual lines connected after cuing are not decided for transmission (even if the transmit enable time is satisfied). As a result, there exists a problem in that the actual transmit time is delayed and thereby the maximum cell intervals (the minimum cell rate) cannot be ensured. In the case where the transmitted data are audio signals or the motion picture signals, if the maximum cell intervals are not ensured, there arises a trouble in that the data are delayed or not transmitted correctly.

Further, to overcome this problem, it may be considered that the cuing is controlled according to the priority sequence or that additional periodic deciding means for only the virtual lines of high transmit priority sequence are provided. In this method, however, these methods are of cuing change processing, there arise other problems in that the performance of the communication control apparatus deteriorates due to an increase in overhead or due to the repeated selection to the periodic deciding means of a high priority sequence.

In the apparatus of the second method, since the virtual lines are cued for each transmit enable time, there exists a problem in that the virtual lines before cuing are selected with a priority, in the same way as with the case of the first method. Further, when there are many virtual lines cued at a specific transmit enable time, a long time is required for the processing, and thereby the transmission of the virtual lines at another transmit enable time is delayed, with the result that the maximum cell intervals are not ensured.

SUMMARY OF THE INVENTION

With these problems in mind, therefore, it is the object of the present invention to provide a communication control apparatus which can execute the transmit decision processing for a plurality of virtual lines simultaneously, while ensuring the maximum cell intervals.

To achieve the above-mentioned object, the present invention provides a communication control apparatus, comprising:

time comparing means for storing transmit enable times corresponding to a plurality of virtual lines respectively, comparing all the stored transmit enable times with transmit decision time inputted from the outside simultaneously, and outputting match signals to all the virtual lines corresponding to all the transmit enable times which match the transmit decision time;

flag holding means having flags each corresponding to each of the virtual lines, for setting the flags corresponding to the match signals whenever the match signals are inputted from said time comparing means; and priority deciding means having priority flags each corresponding to each of the virtual lines, each priority sequence data indicative of priority sequence of the virtual line being stored in each of the priority flags, the priority sequences of a plurality of the priority sequence data stored in the priority flags, which priority flags corresponding to the flags set by said flag holding means, being compared with each other to execute the transmit processing of the virtual lines in accordance with the priority sequences.

Further, the present invention provides a communication control apparatus, comprising:

time comparing means for storing transmit enable times corresponding to a plurality of virtual lines respectively, comparing all the stored transmit enable times with transmit decision time inputted from the outside simultaneously, and outputting match signals to all the virtual lines corresponding to all the transmit enable times which match the transmit decision time, flag holding means composed of first to m-th flag holding means, each having flags each corresponding to each of the virtual lines, contents of the flags of each of said flag holding means being transferable to the flags of the succeeding stage flag holding means, respectively; and priority deciding means having priority flags each corresponding to each of the virtual lines, each priority sequence data indicative of priority sequence of the virtual line being stored in each of the priority flags, all the flags set by all said flag holding means being inputted to said priority deciding means, the priority sequences of the priority sequence data stored in the priority flags, which priority flags corresponding to the flags set by said flag holding means, being compared with one another to execute the transmit processing of the virtual lines in accordance with the priority sequences.

According to the present invention, since the transmit enable times set to a plurality of virtual lines having transmissible data are compared with the transmit decision time by the time comparing means simultaneously, it is possible to execute the simultaneous decision processing for a plurality of virtual lines. Further, it is possible to eliminate such problems that actual transmit time is delayed and that maximum cell intervals are not ensured.

Further, since the priority flags are used, the virtual lines having higher priority sequence can be outputted in sequence, so that it is possible to suppress the maximum cell intervals and further to execute the simultaneous decision processing for a plurality of virtual lines.

Further, according to the present invention, since two flag holding means are provided, when the concurrent virtual line processing takes a long time at a specific transmit time, the decision results of the virtual lines transmissible after the specific transmit time can be held by the first flag holding means. In addition, the virtual lines having higher priority sequence in the first flag holding means can be transmitted with priority, in comparison with the virtual lines in the second flag holding means. In more detail, when a long transmit processing time is required for the virtual lines, new flags are set in the first flag holding means. Here, if the priority sequence of the set flags is higher than that of the flags set in the second flag holding means, the transmit processing is executed for the virtual lines corresponding to the flags set in the first flag holding means.

Further, according to the present invention, since the two flag holding means are provided, the transmit decision time updated for each cell period can be inputted. Therefore, it is possible to prevent the delay of the transmit decision time, and thereby the maximum cell intervals can be suppressed.

Further, according to the present invention, when the priority flags are decided on the basis of the sorts of the cell rates (e.g., CBR, VBR, ABR, etc.), since the priority flags are to be decided under consideration of the data sorts, data burst transmission, etc., data can be transmitted more efficiently, so that the maximum cell intervals can be suppressed more effectively.

Further, according to the present invention, when the flags are used according to the rate change of the cells to be transmitted with respect to time, even if there exists a plurality of virtual lines transmissible at the same time, since the priority sequence of the virtual lines delayed in the current transmission can be raised by use of the priority flags at the succeeding transmission, it is possible to decide the virtual lines to be transmitted on priority basis in the concurrent transmission together with the other virtual lines at the succeeding transmit time, with the result that the maximum cell intervals can be suppressed.

Further, according to the present invention, since the time comparing means of content addressable memory (CAM) is used as the time comparing means, the transmit enable times set to a plurality of the virtual lines having transmissible data are compared simultaneously with the transmit decision time; that is, the transmit decision time can be compared with all the virtual enable times at the same time. Therefore, it is possible to prevent the problems such that the actual transmit time is delayed or the maximum cell intervals are not ensured, being different from the conventional sequential retrieval method such that the virtual lines cued by the non-selected periodic deciding means or the virtual lines connected after cuing are not transmitted at the transmit enable time.

BRIEF DESCRIPTION OF THE DRAWINGS

FIG. 5 is an illustration for assistance in explaining a second example of conventional communication control apparatus.

DETAILED DESCRIPTION OF THE EMBODIMENTS

Some embodiments of the communication control apparatus according to the present invention will be described hereinbelow with reference to the attached drawings.

(First Embodiment)

Figure 1:
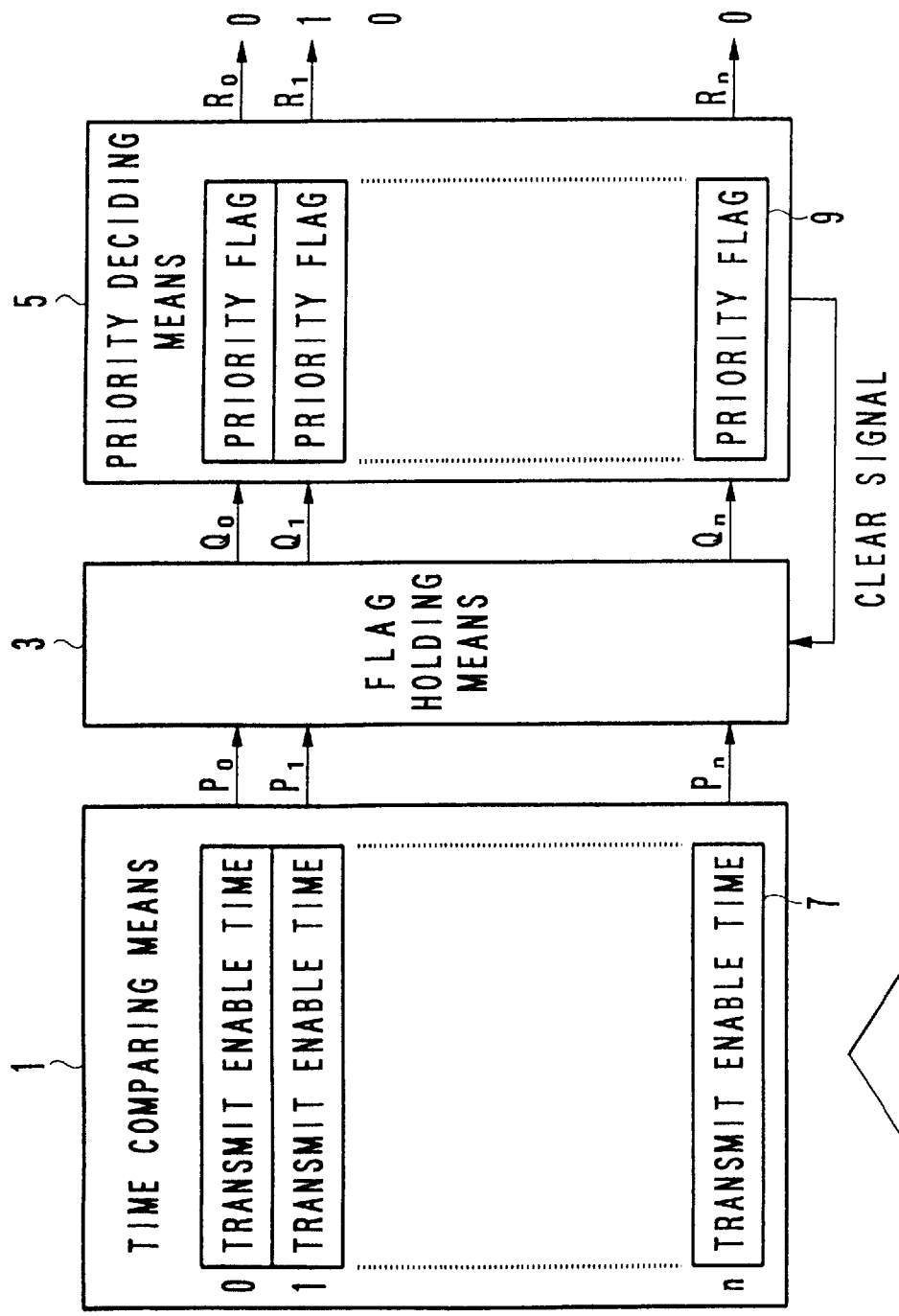
FIG. 1 is a block diagram showing a first embodiment of the communication control apparatus according to the present invention.
Figure 2:
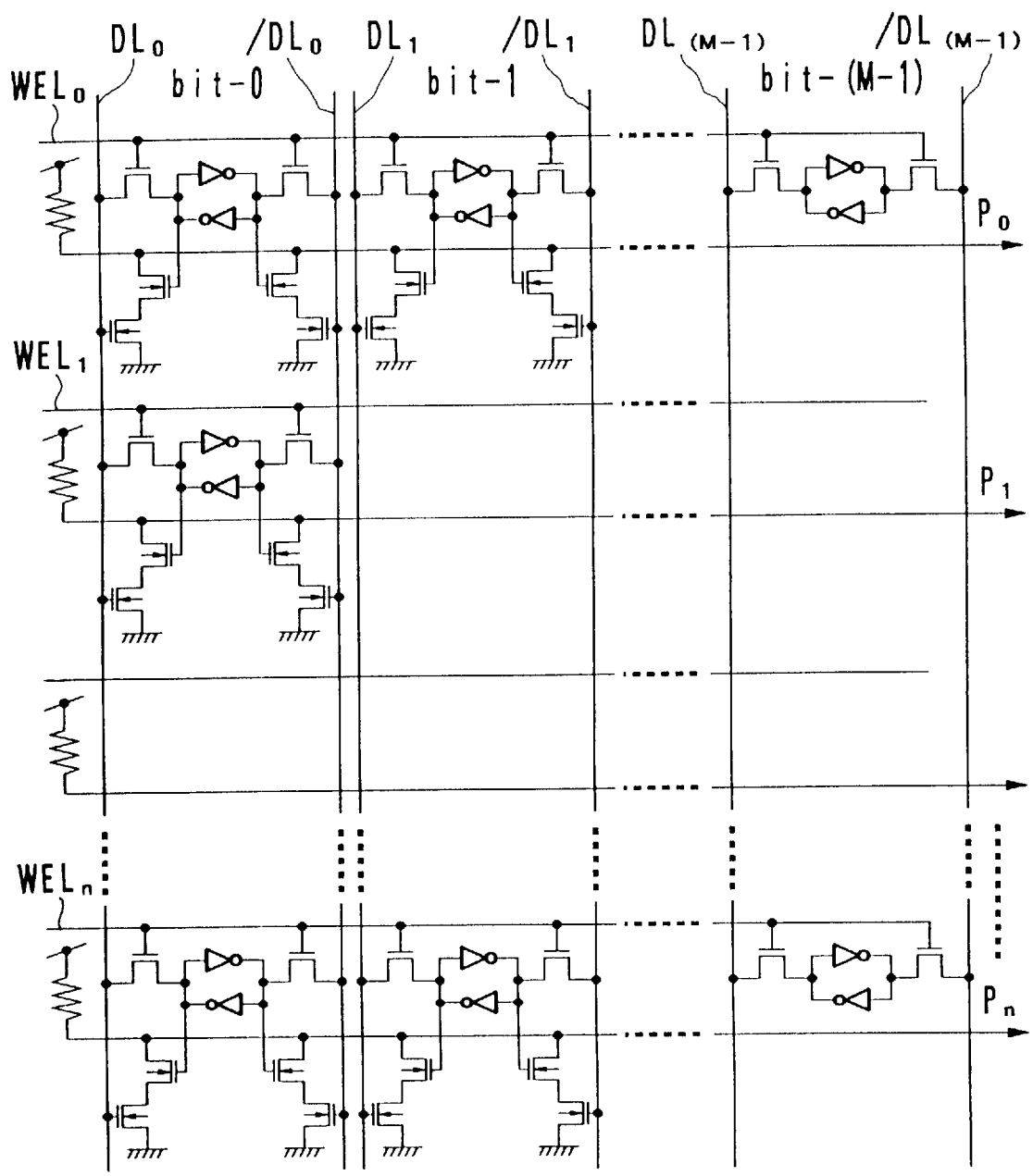
FIG. 2 is an illustration showing a content addressable memory of the transmit enable time storing section 7 shown in FIG. 1.

FIGS. 1 and 2 show a first embodiment of the present invention. In FIG. 1, the communication control apparatus comprises a time comparing means 1, a flag holding means 3 and a priority deciding means 5. The time comparing means 1 includes a transmit enable time storing section 7 for storing the transmit enable times of respective virtual lines; compares a transmit decision time supplied by transmit decision time generating means (not shown) with all the virtual line enable times stored in the transmit enable time storing section 7 simultaneously; and outputs a match signal to the outputs $P_a$, $P_b$, ..., $P_x$ (a, b, ..., x are any one of 0 to n) of a plurality of the virtual lines whose transmit enable times match the transmit decision time, respectively.

Here, as shown in FIG. 2, the transmit enable time storing section 7 is a content addressable memory (referred to as CAM, hereinafter), for instance for storing an M-bit transmit enable time for each of (n+1)-units of words representative of a plurality of the virtual lines. However, any type of memory units can be used, as far as the transmit enable times of a plurality of the virtual lines can be written and read, respectively. By use of this CAM, it is possible to simultaneously compare the transmit decision time with all the transmit enable times of all the virtual lines stored in the transmit enable time storing section 7. As a result, it is possible to solve the problem such that the actual transmit time is delayed and thereby the maximum cell intervals (the minimum cell rate) cannot be ensured, being different from the conventional sequential retrieval method such that the virtual lines cued by the non-selected periodic deciding means or the virtual lines connected after cuing is not decided for transmission, even if the transmit enable time is satisfied.

The above-mentioned CAM will be briefly explained hereinbelow with reference to FIG. 2, because the CAM is well known in the art. Here, a word #0 having bit-0 to bit-(m−1) corresponding to the virtual line #0 will be explained by way of example. In order to store the transmit enable time in the CAM, a write enable line $WEL_0$ is first selected. Under this condition, when data are transmitted through the data lines $DL_0$ to $DL_{(M-1)}$ and $/DL_0$ to $/DL_{(M-1)}$, the data (i.e., the transmit enable time) can be written as M-bit data. With respect to the other words #1 to #n, in the same way as above, the other transmit enable times can be written as M-bit data, respectively.

Further, all the (n+1)-units of transmit enable times written as described above are compared with one transmit decision time simultaneously as follows:

The transmit decision time is transmitted to data line pairs $DL_0$ to $DL_{(M-1)}$ and $/DL_0$ to $/DL_{(M-1)}$ as M-bit data. Therefore, only when all the bits of one transmit decision time match all the bits of a transmit enable time, a match signal is outputted to the output $P_i$ of the virtual line.

Further, the flag holding means 3 holds the match signals of the respective outputs $P_a$, $P_b$, ..., $P_x$ of the time comparing means 1. In addition, in response to a clear signal applied by the priority deciding means 5, this flag holding means 3 clears the match signals of the virtual lines selected by the priority deciding means 5 for data transmission. Accordingly, as the flag holding means 3, it is possible to use flip-flop circuits or latch circuits each provided with a clearing function at a predetermined portion, respectively.

The priority deciding means 5 has a priority flag storing section 9 of plural bits for each of a plurality of the virtual lines. In this priority flag storing section 9, a priority flag indicative of the priority sequence of each virtual line is stored to output the virtual lines in accordance with the priority sequence, when a plurality of match signals are detected at the same time from the outputs $Q_a$, $Q_b$, ..., $Q_x$ of the flag holding means 3.

Further, the priority deciding means 5 compares the above-mentioned priority flags of the virtual lines having the outputs $Q_a$, $Q_b$, ..., $Q_x$ outputted by the flag holding means 3, (i.e., having the match signals outputted by the time comparing means 1), and selects the virtual lines one by one in the stored priority sequence. Further, when the priority flags have the same priority sequence, the priority deciding means 5 selects the virtual lines having the same priority one by one in sequence beginning from the virtual lines arranged on the higher orders, and outputs output signals $R_y$ (y designates a channel number from 0 to n) corresponding to the selected virtual lines. After the transmit processing of the virtual line corresponding to the output signal $R_y$ has been completed, the output $Q_y$ of the flag holding means 3 for the virtual line y is cleared. After that, the priority deciding means 5 starts to process the succeeding virtual line selected. Here, it is preferable to decide the priority flags on the basis of the sort of the cell rate to be used. Here, the sorts of the cell routes are the cell transmit rates as CBR, VBR, ABR, etc., as already explained, which are preferably decided under consideration of the sorts of data, the burst condition of the transmitted data, etc.

After the priority deciding means 5 completes all the virtual line decision, as described above, all the match signal outputs $Q_a$, $Q_b$, ..., $Q_x$ of the flag holding means 3 are cleared, and the data transmit decision time is counted up by the transmit decision time generating means (not shown) to execute the succeeding time decision.

As described above, in the first embodiment, since the transmit enable times can be retrieved simultaneously by the time comparing means 1, it is possible to suppress the maximum cell intervals, and further to execute the simultaneous transmit decision processing for a plurality of virtual lines. In addition, since the priority flag storing section 9 is so formed as to write and read priority data, even when there are a plurality of virtual lines transmittable at the same time, since the priority sequence of the virtual lines delayed in the current transmission can be raised by use of the priority flags at the succeeding transmission, it is possible to decide the virtual lines to be transmitted on priority basis in the concurrent transmission together with the other virtual lines at the succeeding transmit time, with the result that the maximum cell intervals can be suppressed.

In more detail, the first embodiment can be modified as follows: Here, the assumption is made that there are many virtual lines which match the current (first) transmit decision time, so that a virtual line not yet transmitted remains until the succeeding (second) transmit decision time is inputted. In this case, when the second transmit decision time has been inputted, the priority sequence of the remaining virtual line not yet transmitted is raised. By doing this, the following function can be obtained: Even if the priority of the second virtual line whose flag is newly set by the input of the second transmit decision time is the same as that of the first virtual line whose flag is already set by the input of the first transmit decision time, since the priority sequence of the first virtual line is raised by the input of the second transmit decision time, it is possible to execute the transmit processing of the first virtual line with priority, which is earlier than the transmit processing of the second virtual line.

(Second Embodiment)

In this second embodiment, the communication control apparatus comprises a plurality of flag holding means, which is different from the first embodiment.

Figure 3:
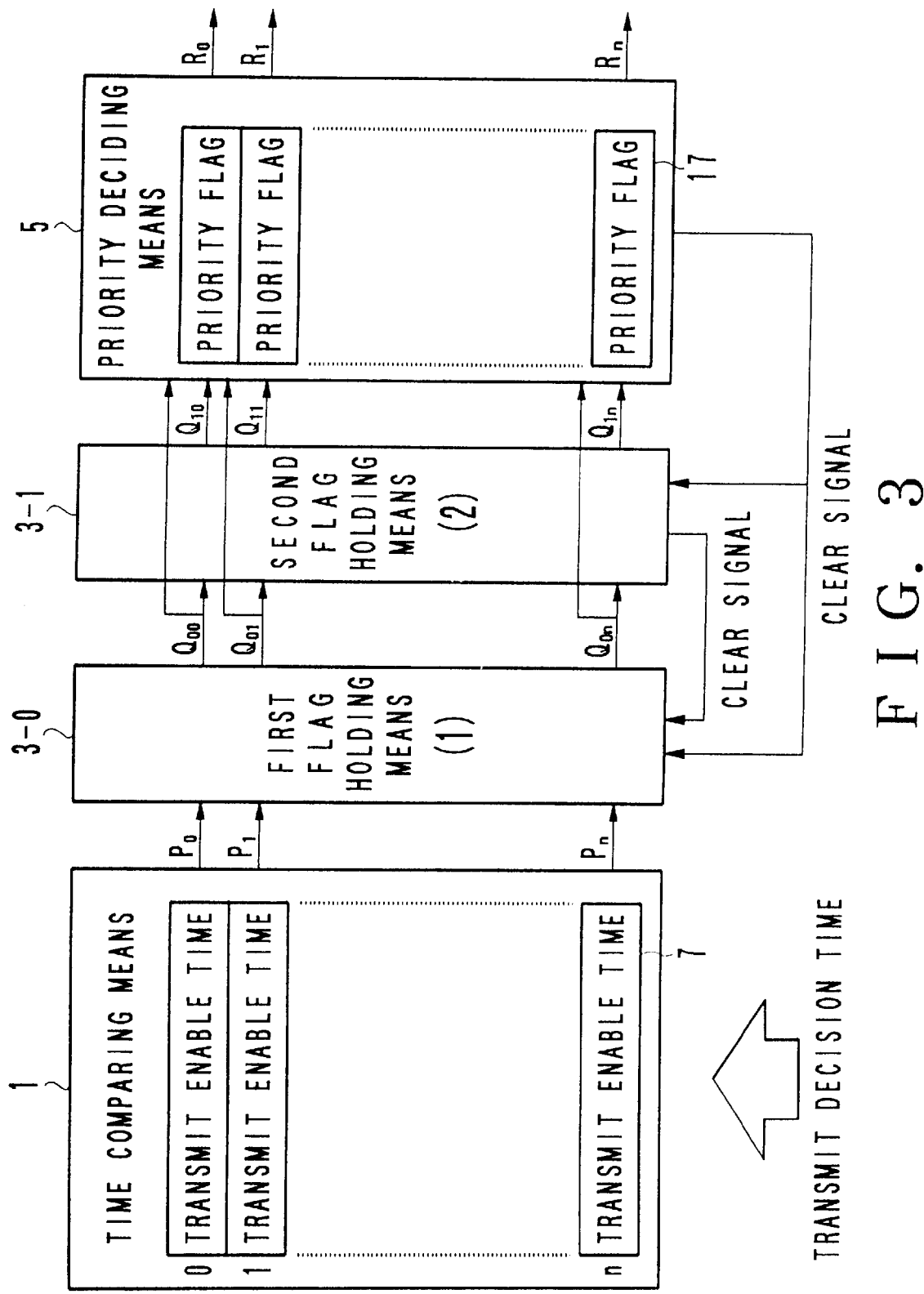
FIGS. 3, 3A and 3B are block diagrams each showing a second embodiment of the communication control apparatus according to the present invention, respectively.

FIGS. 3 show a second embodiment of the present invention, in which two flag holding means are provided by way of example. Further, in FIG. 3, the same reference numerals have been retained for similar elements which have the same functions as with the case of the first embodiment.

The control apparatus shown in FIG. 3 will be first roughly explained as follows: The flag holding means is composed of two-stages of first flag holding means 3-0 and second flag holding means 3-1. When the match signals are applied to the outputs $P_i$ of the virtual lines, the flags of the first flag holding means 3-0 corresponding to the virtual lines having the match signals are set respectively. The priority sequence of the virtual lines corresponding to the outputs $Q_{oi}$ of the set flags is decided by the priority deciding means 5, in the same way as with the case of the first embodiment, for execution of the transmit processing of the virtual lines. After the transmit processing, the flags of the first flag holding means 3-0 are all cleared. The flags set by the first flag holding means 3-0 at a certain timing are all transferred to the second flag holding means 3-1 of the succeeding stage. After that, all the flags of the first flag holding means 3-0 are cleared. Successively, whenever the transmit decision time is inputted, the flags of the first flag holding means 3-0 corresponding to the virtual lines are set, as far as the transmit enable times of the virtual lines match the transmit decision time, respectively. As described above, the outputs $Q_{oi}$ of the flags set by the first flag holding means 3-0 and the outputs $Q_{li}$ of the flags set by the second flag holding means 3-1 are inputted to the priority deciding means 5 at the same time. The priority deciding means 5 decides the priority sequence of the virtual lines corresponding to the set flags of the first and second flag holding means 3-0 and 3-1, respectively. In this decision processing, when the priority sequence of the virtual lines corresponding to the outputs $Q_{oi}$ and $Q_{li}$ of the first and second flag holding means 3-0 and 3-1 are equal to each other, the virtual line corresponding to the output $Q_{li}$ of the second flag holding means 3-1 is weighted; that is, decided as that the priority sequence of the outputs $Q_{li}$ of the second flag holding means 3-1 is higher than the virtual line corresponding to the output $Q_{oi}$ of the first flag holding means 3-0. As described above, the virtual lines are transmit-processed beginning from the virtual line decided as being the highest priority sequence.

Figure 3A:
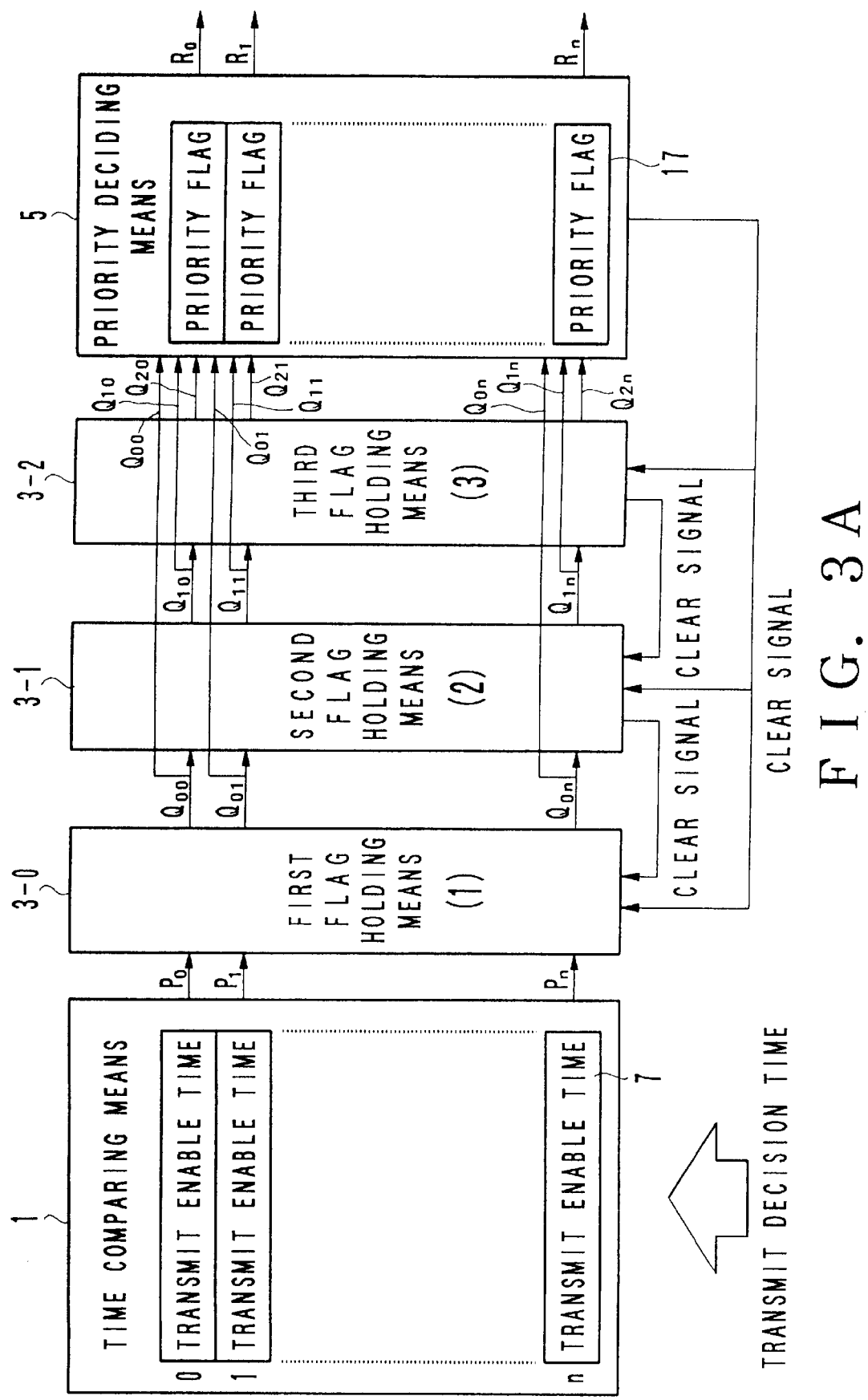
Figure 3B:
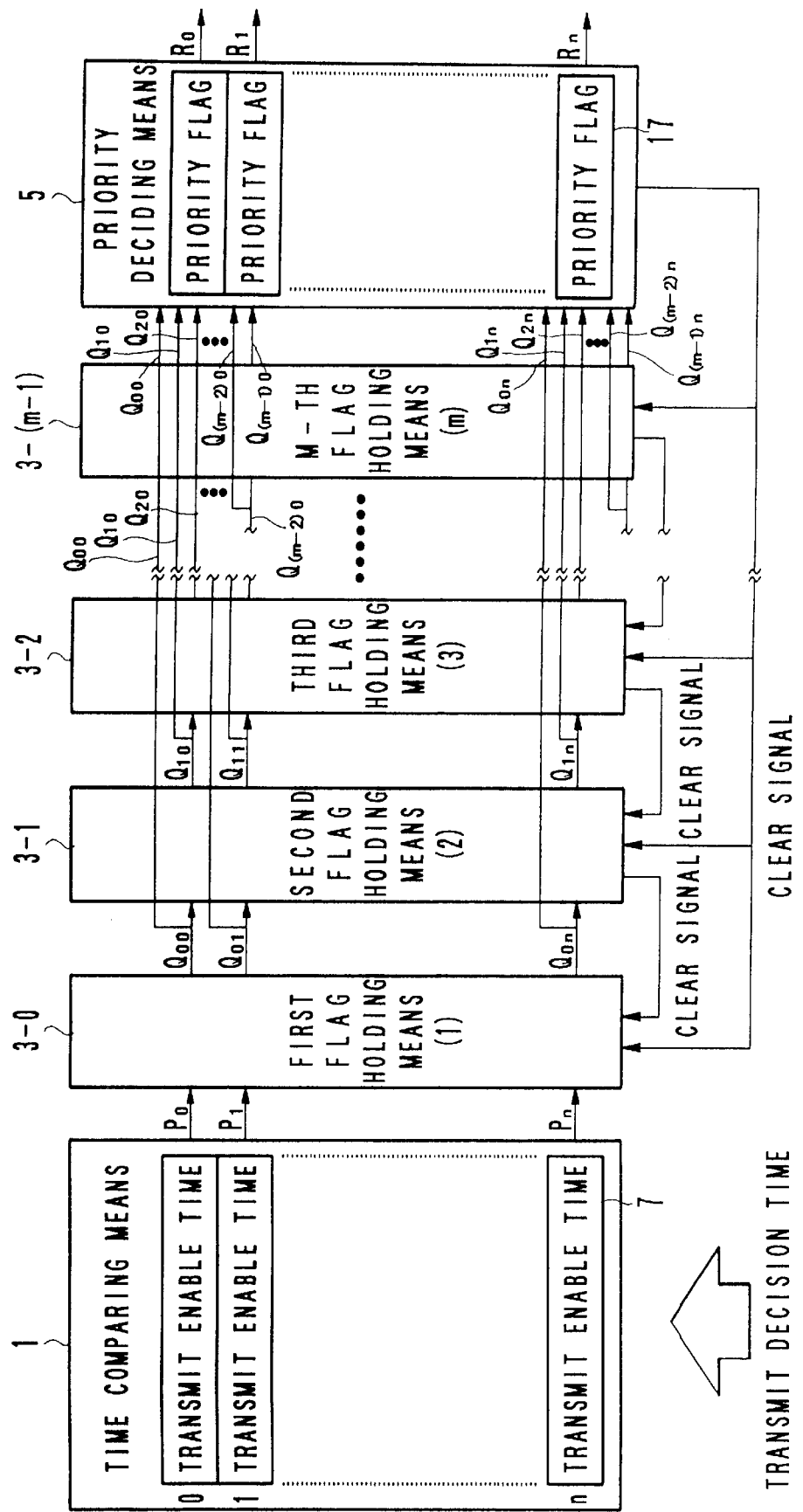
Figure 4:
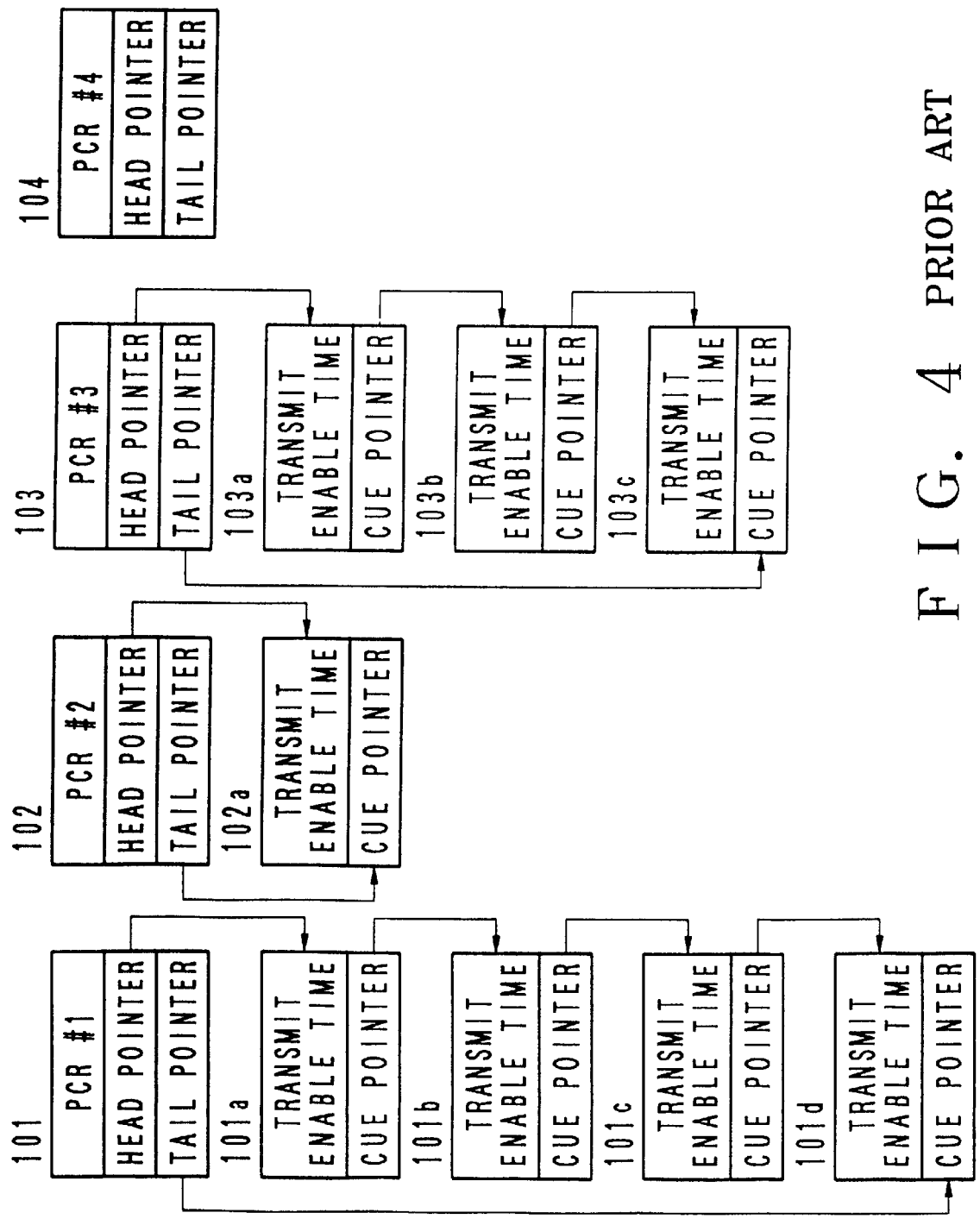
FIG. 4 is an illustration for assistance in explaining a first example of conventional communication control apparatus.

Further, FIG. 3A is an example in which three-stage flag holding means are provided, and FIG. 3B is an example in which m-stage flag holding means are provided. The operation of these three- or m-stage flag holding means is basically the same as with the case of the two-stage flag holding means as shown in FIG. 3, so that any detailed description thereof is omitted herein.

Here, the communication control apparatus shown in FIG. 3 will be explained hereinbelow from different points of view. In this embodiment, the time comparing means 1 always receives a transmit decision time for each cell period from transmit decision time generating means (not shown). Here, as the transmit decision time generating means, it is also possible to use a counter for generating the transmit decision time by incrementing the counter by a predetermined time. The inputted transmit decision time is compared with the transmit enable time. In the same way as with the case of the first embodiment, in this comparison, the transmit decision time is compared with all the virtual line enable times stored in the transmit enable time storing section 7, and a match signal is outputted to a plurality of the virtual line outputs $P_a$, $P_b$, ..., $P_x$ (a, b, ..., x are any one of 0 to n) whose transmit enable times match the transmit decision times, respectively. Further, in the same way as with the case of the first embodiment and as shown in FIG. 2, the transmit enable time storing section 7 is a content addressable memory (referred to as CAM, hereinafter), for instance for storing an M-bit transmit enable time for each of n-units of words representative of a plurality of the virtual lines. However, any type of memory units can be used, as far as the transmit enable times of a plurality of the virtual lines can be written and read, respectively.

The first flag holding means 3-0 adds and holds the match signals of the outputs $P_0$ to $P_n$ applied by the time comparing means 1 in response to the transmit decision times inputted for each cell period. In other words, the first flag holding means 11 always receives and holds the new match signals of the outputs $P_0$ to $P_n$ applied by the time comparing means 1 together with or in combination with the previous match signals (i.e., by merging both the old and new match signals). Further, the first flag holding means 3-0 is so constructed as to clear all the virtual lines on the basis of the clear signal applied by the second flag holding means 3-1 and further the virtual lines selected for data transmission by the priority deciding means 5.

When the holding signals of all the virtual lines have been already cleared, the second flag holding means 3-1 inputs and holds the outputs $Q_{00}$ to $Q_{0m}$ of all the virtual lines applied by the first flag holding means 3-0. In this case, the second flag holding means 3-1 outputs a clear signal to the first flag holding means 3-0. Further, the second flag holding means 3-1 clears the virtual lines selected by the priority deciding means 5 for data transmission.

The priority deciding means 5 decides the transmitted virtual lines having a specific priority flag respectively, on the basis of the priority decision, in the same way as in the first embodiment, from among the virtual lines having the match signals held by the first flag holding means 3-0. Here, when there exists no virtual line having the specific flag, the second flag holding means 3-1 decides a transmitted virtual lines having the match signal on the basis of the priority decision, in the same way as in the first embodiment. Further, the output signal $R_y$ (y designates a channel number) corresponding to the selected virtual line is outputted.

In other words, the first and second flag holding means 3-0 and 3-1 are observed simultaneously. In particular, it is considered that a new match signal is applied to the first flag holding means 3-0 so that a new flag is set. In this case, there exists the case where the priority sequence of the virtual line corresponding to the newly set flag is higher than the virtual lines corresponding to the already-set flags. In such a case as described above, the transmit processing is first executed for the virtual line having the higher priority sequence. Here, if there exists no flag corresponding to the virtual line having such a high priority sequence as described above, the first and second flag holding means 3-0 and 3-1 are observed simultaneously. In this case, the flags set by the second flag holding means 3-1 are weighted in comparison with the flags set by the first flag holding means 3-0. That is, when the flags of the same priority sequence are set in both the first and second flag holding means 3-0 and 3-1, the virtual lines corresponding to the flags set by the second flag holding means 3-1 are first transmit-processed.

After the transmit processing of the virtual line corresponding to the output signal $R_y$ has been completed, the output $Q_y$ of the first or second flag holding means 3-0 or 3-1 for the virtual line y is cleared. After that, the priority deciding means 5 starts to process the succeeding virtual line selected.

As described above, since a plurality of flag holding means are provided, when a long time is needed for the concurrent processing of the virtual lines at a specific transmit time, the decision results of the virtual lines transmittable after this transmit time can be held by the first flag holding means 3-0, and in addition the virtual line having a higher priority sequence in the first flag holding means 3-0 can be decided for transmission with a priority over the virtual lines held in the second flag holding means 3-1. As a result, it is possible to suppress the maximum cell intervals.

As described above, in the communication control apparatus according to the present invention, since it is possible to suppress the delay caused by the concurrence of a plurality of virtual lines at the same transmit time and further to transmit a specific virtual line with a priority, the maximum cell intervals can be suppressed effectively.

What is claimed is:

1. A communication control apparatus, comprising:
    time comparing means for storing transmit enable times corresponding to a plurality of virtual lines respectively, the time comparing means simultaneously comparing all the stored transmit enable times with a transmit decision time inputted from outside of the time comparing means, and outputting match signals to all the virtual lines corresponding to all the transmit enable times which match the transmit decision time;
    flag holding means having flags each corresponding to each of the virtual lines, for setting the flags corresponding to the match signals whenever the match signals are inputted from said time comparing means; and
    priority deciding means having priority flags each corresponding to each of the virtual lines, each priority sequence data indicative of priority sequence of the virtual line being stored in each of the priority flags, the priority sequences of a plurality of the priority sequence data stored in the priority flags, which priority flags corresponding to the flags set by said flag holding means, being compared with each other to execute the transmit processing of the virtual lines in accordance with the priority sequences.

2. The communication control apparatus of claim 1, wherein whenever executing the transmit processing for a virtual line, said priority deciding means clears a flag in said flag holding means corresponding to the transmitted virtual line.

3. The communication control apparatus of claim 1, wherein whenever said priority deciding means executes the transmit processing for a virtual line, said time comparing means rewrites the transmit enable time corresponding to the transmit-processed virtual line to a new succeeding transmit enable time.

4. The communication control apparatus of claim 2, wherein whenever said priority deciding means executes the transmit processing for a virtual line, said time comparing means rewrites the transmit enable time corresponding to the transmit-processed virtual line to a new succeeding transmit enable time.

5. The communication control apparatus of claim 1, wherein in the priority flags in said priority deciding means which correspond to the virtual lines not yet transmit-processed among the virtual lines corresponding to the flags set in said flag holding means, the priority sequence data in the priority flags are rewritten to data indicative of higher priority sequence for each predetermined time.

6. The communication control apparatus of claim 2, wherein in the priority flags in said priority deciding means which correspond to the virtual lines not yet transmit-processed among the virtual lines corresponding to the flags set in said flag holding means, the priority sequence data in the priority flags are rewritten to data indicative of higher priority sequence for each predetermined time.

7. The communication control apparatus of claim 3, wherein in the priority flags in said priority deciding means which correspond to the virtual lines not yet transmit-processed among the virtual lines corresponding to the flags set in said flag holding means, the priority sequence data in the priority flags are rewritten to data indicative of higher priority sequence for each predetermined time.

8. The communication control apparatus of claim 1, wherein the priority sequence indicated by the priority sequence data of the respective virtual lines stored in the respective priority flags of said priority deciding means is decided on the basis of sorts of routes of transmitted cells.

9. The communication control apparatus of claim 5, wherein the priority sequence indicated by the priority sequence data of the respective virtual lines in the respective priority flags in said priority deciding means is decided on the basis of sorts of routes of transmitted cells.

10. The communication control apparatus of claim 1, wherein said time comparing means comprises a content addressable memory for storing the transmit enable times of the virtual lines, respectively, and for comparing the stored transmit enable times with a transmit decision time applied from the outside at the same time.

11. The communication control apparatus of claim 5, wherein said time comparing means comprises a content addressable memory for storing the transmit enable times of the virtual lines, respectively, and for comparing the stored transmit enable times with a transmit decision time applied from the outside at the same time.

12. The communication control apparatus of claim 8, wherein said time comparing means comprises a content addressable memory for storing the transmit enable times of the virtual lines, respectively, and for comparing the stored transmit enable times with a transmit decision time applied from the outside at the same time.

13. A communication control apparatus, comprising:
    time comparing means for storing transmit enable times corresponding to a plurality of virtual lines respectively, the time comparing means simultaneously comparing all the stored transmit enable times with a transmit decision time inputted from the outside of the time comparing means, and outputting match signals to all the virtual lines corresponding to all the transmit enable times which match the transmit decision time;

flag holding means composed of first to m-th flag holding means, each having flags each corresponding to each of the virtual lines, contents of the flags of each of said flag holding means being transferred to the flags of the succeeding stage flag holding means, respectively; and priority deciding means having priority flags each corresponding to each of the virtual lines, each priority sequence data indicative of priority sequence of the virtual line being stored in each of the priority flags, all the flags set by all said flag holding means being inputted to said priority deciding means, the priority sequences of the priority sequence data stored in the priority flags, which priority flags corresponding to the flags set by said flag holding means, being compared with one another to execute the transmit processing of the virtual lines in accordance with the priority sequences.

14. The communication control apparatus of claim 13, wherein when deciding the priority sequences of the priority flags corresponding to the set flag data, said priority deciding means decides the priority flags corresponding to the flag data set by said (i+1)-th flag holding means as being weighted, in comparison with the priority flags corresponding to the flag data set by said i-th flag holding means.

15. The communication control apparatus of claim 13, wherein whenever executing the transmit processing for a virtual line, said priority deciding means clears a flag of said i-th flag holding means which has so far outputted the set flag data to the priority flag corresponding to the virtual line.

16. The communication control apparatus of claim 15, wherein when all the flags of said i-th flag holding means are cleared, contents of the flags of said (i−1)-th flag holding means are transferred to the flags of said i-th flag holding means.

17. The communication control apparatus of claim 13, wherein whenever said priority deciding means executes the transmit processing for a virtual line, said time comparing means rewrites the transmit enable time corresponding to the transmit-processed virtual line to a new succeeding transmit enable time.

18. The communication control apparatus of claim 13, wherein the priority sequence indicated by the priority sequence data of the respective virtual lines stored in the respective priority flags of said priority deciding means is decided on the basis of sorts of routes of transmitted cells.

19. The communication control apparatus of claim 13, wherein said time comparing means comprises a content addressable memory for storing the transmit enable times of the virtual lines, respectively and for comparing the stored transmit enable times with a transmit decision time applied from the outside at the same time.

20. The communication control apparatus of claim 13, wherein m is 2.

21. The communication control apparatus of claim 13, wherein m is 3.

22. A communication control apparatus used for asynchronous communication executed by setting a transmit enable time at which data can be transmitted to a plurality of virtual lines, respectively and by deciding the virtual lines having transmissible data on the basis of the transmit enable times, which comprises:

time comparing means for comparing the transmit enable times set to a plurality of the virtual lines having transmissible data with transmit decision time at the same time, to generate comparison result signals;

flag holding means for holding the comparison result signals generated by said time comparing means for each of a plurality of the virtual lines, and erasing the held comparison result signals of a predetermined virtual line in response to a clear signal; and priority deciding means, when a plurality of the transmissible comparison result signals are held in said flag holding means at the same transmit decision time, for deciding priority of the virtual lines corresponding to the comparison result signals on the basis of rewritable priority flags decided for each of a plurality of the virtual lines to decide one of the virtual lines to be transmitted, and for outputting a clear signal to said flag holding means to erase the comparison result signal of the decided virtual line.

23. A communication control apparatus used for asynchronous communication executed by setting a transmit enable time at which data can be transmitted to each of a plurality of virtual lines, and by deciding the virtual lines having transmissible data on the basis of the transmit enable times, which comprises:

time comparing means for comparing the transmit enable times set to a plurality of the virtual lines having transmissible data, respectively with transmit decision time at the same time, to generate comparison result signals;

first flag holding means for adding and holding the comparison result signals generated by said time comparing means separately for each of a plurality of the virtual lines, and erasing the held comparison result signal of a predetermined virtual line in response to a clear signal;

second flag holding means for erasing own held comparison result signal of a predetermined virtual line in response to the clear signal; when all the own held comparison result signals have been erased, inputting the comparison result signals of the virtual lines held by said first flag holding means; and outputting a signal to erase all the comparison result signals held by said first flag holding means; and priority deciding means, when a plurality of data-transmissible comparison result signals are held in said first and second flag holding means at the same transmit decision time, for deciding priority sequence of the virtual lines corresponding to the comparison result signals on the basis of rewritable priority flags decided for each of a plurality of the virtual lines to decide one of the virtual lines to be transmitted, and for outputting a clear signal to any of said first and second flag holding means to erase the comparison result signal of the decided virtual line.

24. The communication control apparatus of claim 23, wherein said time comparing means inputs updated transmit decision time for each cell period, and compares the updated transmit decision time with the transmit enable time set to a plurality of the virtual lines having transmissible data, respectively at the same time, to generate the comparison result signals.

* * * * *